United States Patent
Staubach et al.

(10) Patent No.: US 11,511,872 B2
(45) Date of Patent: Nov. 29, 2022

(54) HYDROGEN PROPULSION SYSTEMS FOR AIRCRAFT

(71) Applicant: United Technologies Corporation, Farmington, CT (US)

(72) Inventors: Joseph B. Staubach, Colchester, CT (US); Amanda J. L. Boucher, Boston, MA (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 158 days.

(21) Appl. No.: 16/832,477

(22) Filed: Mar. 27, 2020

(65) Prior Publication Data

US 2021/0300575 A1 Sep. 30, 2021

(51) Int. Cl.
*B64D 27/12* (2006.01)
*B64D 13/08* (2006.01)
*B64D 41/00* (2006.01)

(52) U.S. Cl.
CPC ............. *B64D 27/12* (2013.01); *B64D 13/08* (2013.01); *B64D 41/00* (2013.01); *B64D 2041/005* (2013.01)

(58) Field of Classification Search
CPC ........ B64D 27/12; B64D 13/08; B64D 41/00; B64D 2041/005; B64D 2027/026; B64D 27/24; Y02T 50/60
See application file for complete search history.

(56) References Cited

U.S. PATENT DOCUMENTS

| | | | |
|---|---|---|---|
| 5,106,035 A | 4/1992 | Langford, III | |
| 6,641,084 B1* | 11/2003 | Huber | B64D 41/00 |
| | | | 244/48 |
| 7,043,920 B2 | 5/2006 | Viteri et al. | |
| 8,015,808 B2 | 9/2011 | Keefer et al. | |
| 9,397,361 B2 | 7/2016 | Papile | |
| 2013/0084474 A1 | 4/2013 | Mills | |
| 2015/0308383 A1* | 10/2015 | Hoffjann | H01M 8/24 |
| | | | 60/269 |
| 2017/0211474 A1* | 7/2017 | Sennoun | F02C 6/00 |
| 2017/0327219 A1* | 11/2017 | Alber | H02S 20/00 |
| 2019/0009917 A1* | 1/2019 | Anton | B60L 50/70 |
| 2019/0372449 A1 | 12/2019 | Mills | |

(Continued)

FOREIGN PATENT DOCUMENTS

| | | |
|---|---|---|
| CN | 109915220 A | 6/2019 |
| EP | 3805107 A1 | 4/2021 |
| WO | 2020003181 A1 | 1/2020 |

OTHER PUBLICATIONS

European Search Report for European Application No. 21165373.8, dated Aug. 5, 2021, 8 pages.

(Continued)

*Primary Examiner* — Valentina Xavier
(74) *Attorney, Agent, or Firm* — Cantor Colburn LLP

(57) ABSTRACT

Aircraft propulsion systems and aircraft having such propulsion systems are described. The aircraft propulsion systems include a fan, a motor operably connected to the fan by a drive shaft, and an aircraft power generation system operably coupled to the motor to drive rotation of the fan through the drive shaft, wherein the aircraft power generation system comprises a fuel cell configured to generate at least 1 MW of electrical power.

19 Claims, 6 Drawing Sheets

(56) References Cited

U.S. PATENT DOCUMENTS

2021/0340884 A1\* 11/2021 Macdonald ............... F02C 1/10
2021/0340908 A1\* 11/2021 Boucher ................ F02C 7/224

OTHER PUBLICATIONS

"Liquid Hydrogen as a Propulsion Fuel, 1945-1959, Part II: 1950-1957, 8. Suntan, The Model 304 Engine". Retrieved via internet: https://history.nasa.gov/SP-4404/ch8-9.htm; Apr. 30, 2020 (4 pages).

\* cited by examiner

HYDROGEN PROPULSION SYSTEMS FOR AIRCRAFT

TECHNICAL FIELD

The present disclosure relates generally to aircraft propulsion systems, and more specifically to hydrogen propulsion systems for aircraft.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section further drives the compressor section to rotate. In some configurations, a fan is also connected to the shaft and is driven to rotate via rotation of the turbine.

However, such gas turbine engines generate waste products, such as $CO_2$. It may be advantageous to have aircraft propulsion systems that do not generate waste byproducts, including $CO_2$.

BRIEF SUMMARY

According to some embodiments, aircraft propulsion systems are provided. The aircraft propulsion systems include a fan, a motor operably connected to the fan by a drive shaft, and an aircraft power generation system operably coupled to the motor to drive rotation of the fan through the drive shaft, wherein the aircraft power generation system comprises a fuel cell configured to generate at least 1 MW of electrical power.

In addition to one or more of the features described above, or as an alternative, further embodiments of the aircraft propulsion systems may include that the aircraft power generation system comprises a fuel source.

In addition to one or more of the features described above, or as an alternative, further embodiments of the aircraft propulsion systems may include that the fuel cell is a solid oxide fuel cell.

In addition to one or more of the features described above, or as an alternative, further embodiments of the aircraft propulsion systems may include that the fan, the motor, and the aircraft power generation system are housed within a propulsion system housing.

In addition to one or more of the features described above, or as an alternative, further embodiments of the aircraft propulsion systems may include that the propulsion system housing is configured to be mounted to a wing of an aircraft.

In addition to one or more of the features described above, or as an alternative, further embodiments of the aircraft propulsion systems may include that the aircraft power generation system comprises a fuel supply line that originates at a fuel source, and passes through at least one of a waste-heat heat exchanger, an expansion turbine, and an aircraft system cooler, prior being supplied to the fuel cell.

In addition to one or more of the features described above, or as an alternative, further embodiments of the aircraft propulsion systems may include a supplemental power generator configured to receive at least a portion of a fuel of the fuel cell.

In addition to one or more of the features described above, or as an alternative, further embodiments of the aircraft propulsion systems may include that the supplemental power generator is a Brayton cycle power generator.

In addition to one or more of the features described above, or as an alternative, further embodiments of the aircraft propulsion systems may include that the supplemental power generator is configured to generate additional power and supplement the power generated by the fuel cell when driving the motor.

In addition to one or more of the features described above, or as an alternative, further embodiments of the aircraft propulsion systems may include a waste heat recovery system operably connected to a fuel supply line from a fuel source to the fuel cell.

In addition to one or more of the features described above, or as an alternative, further embodiments of the aircraft propulsion systems may include that the waste heat recovery system comprises a turbine, a compressor, a recuperating heat exchanger, a waste-heat heat exchanger, and a pressure-balanced heat exchanger.

In addition to one or more of the features described above, or as an alternative, further embodiments of the aircraft propulsion systems may include that the pressure-balanced heat exchanger receives a fuel for the fuel cell in a first path and a working fluid of the waste heat recovery system in a second path.

In addition to one or more of the features described above, or as an alternative, further embodiments of the aircraft propulsion systems may include that the aircraft power generation system comprises an aircraft system cooler configured to use a fuel for the fuel cell as a cold sink and is configured to cool at least one of aircraft air loads and aircraft liquid loads.

According to some embodiments, aircraft are provided. The aircraft include a fuselage, wings, and an aircraft propulsion system mounted to at least one of the fuselage and the wings. The aircraft propulsion system includes a fan, a motor operably connected to the fan by a drive shaft, and an aircraft power generation system operably coupled to the motor to drive rotation of the fan through the drive shaft, wherein the aircraft power generation system comprises a fuel cell configured to generate at least 1 MW of electrical power.

In addition to one or more of the features described above, or as an alternative, further embodiments of the aircraft may include that the aircraft power generation system comprises a fuel source and the fuel cell is a solid oxide fuel cell.

In addition to one or more of the features described above, or as an alternative, further embodiments of the aircraft may include that the fan, the motor, and the aircraft power generation system are housed within a propulsion system housing.

In addition to one or more of the features described above, or as an alternative, further embodiments of the aircraft may include that the propulsion system housing is configured to be mounted to a wing of an aircraft.

In addition to one or more of the features described above, or as an alternative, further embodiments of the aircraft may include that the aircraft power generation system comprises a fuel supply line that originates at a fuel source, and passes through at least one of a waste-heat heat exchanger, an expansion turbine, and an aircraft system cooler, prior being supplied to the fuel cell.

In addition to one or more of the features described above, or as an alternative, further embodiments of the aircraft may include a supplemental power generator configured to receive at least a portion of a fuel of the fuel cell.

In addition to one or more of the features described above, or as an alternative, further embodiments of the aircraft may include a waste heat recovery system operably connected to a fuel supply line from a fuel source to the fuel cell.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
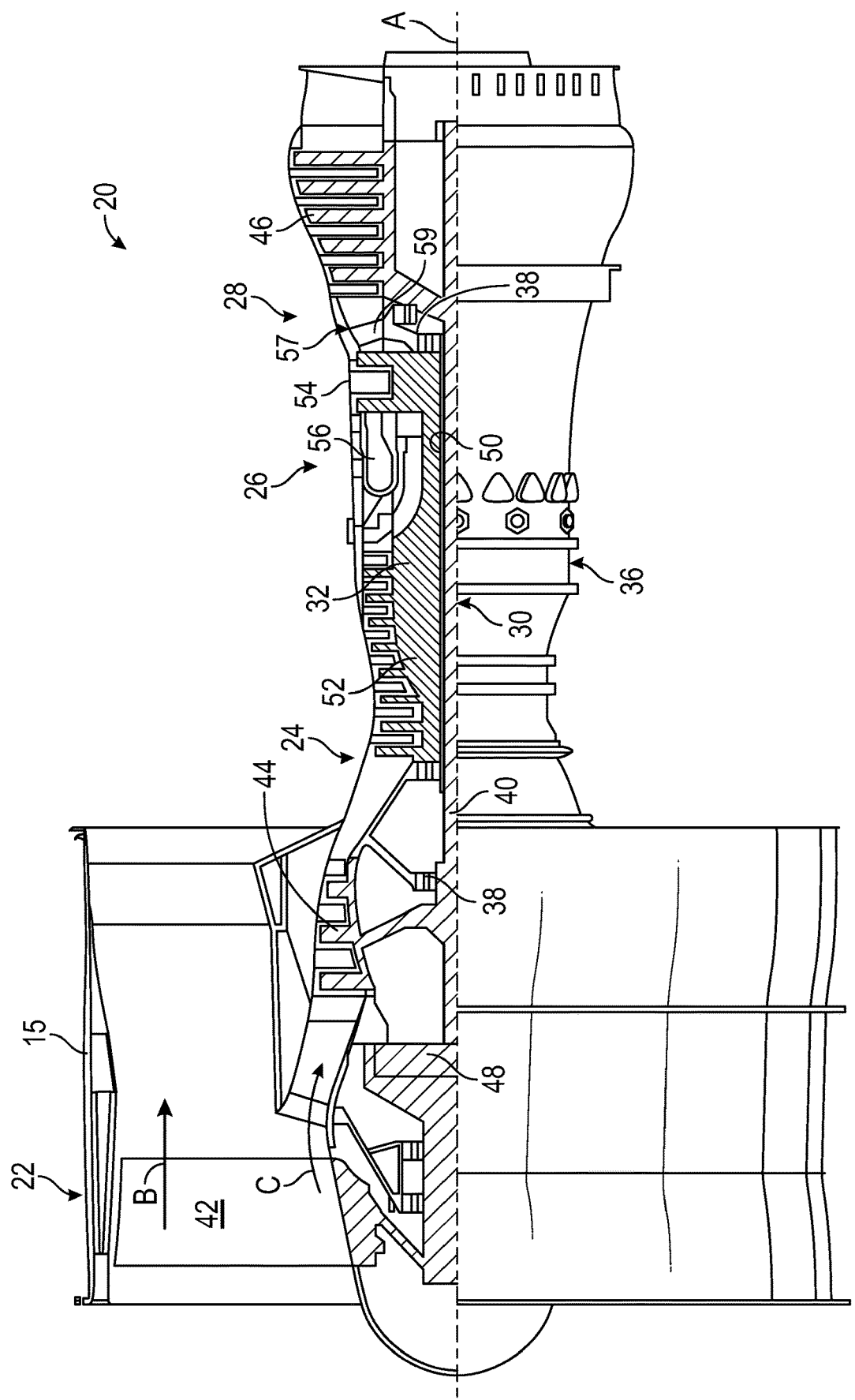
FIG. 1 is a schematic cross-sectional illustration of a gas turbine engine architecture.

FIG. 1 schematically illustrates a gas turbine engine 20. As illustratively shown, the gas turbine engine 20 is configured as a two-spool turbofan that has a fan section 22, a compressor section 24, a combustor section 26, and a turbine section 28. The illustrative gas turbine engine 20 is merely for example and discussion purposes, and those of skill in the art will appreciate that alternative configurations of gas turbine engines may employ embodiments of the present disclosure. The fan section 22 includes a fan 42 that is configured to drive air along a bypass flow path B in a bypass duct defined within a nacelle 15. The fan 42 is also configured to drive air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines.

In this two-spool configuration, the gas turbine engine 20 includes a low speed spool 30 and a high speed spool 32 mounted for rotation about an engine central longitudinal axis A relative to an engine static structure 36 via one or more bearing systems 38. It should be understood that various bearing systems 38 at various locations may be provided, and the location of bearing systems 38 may be varied as appropriate to a particular application and/or engine configuration.

The low speed spool 30 includes an inner shaft 40 that interconnects the fan 42 of the fan section 22, a first (or low) pressure compressor 44, and a first (or low) pressure turbine 46. The inner shaft 40 is connected to the fan 42 through a speed change mechanism, which, in this illustrative gas turbine engine 20, is as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the combustor section 26 between the high pressure compressor 52 and the high pressure turbine 54. A mid-turbine frame 57 of the engine static structure 36 is arranged between the high pressure turbine 54 and the low pressure turbine 46. The mid-turbine frame 57 may be configured to support one or more of the bearing systems 38 in the turbine section 28. The inner shaft 40 and the outer shaft 50 are concentric and rotate via the bearing systems 38 about the engine central longitudinal axis A which is collinear with their longitudinal axes.

The core airflow through core airflow path C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 (e.g., vanes) which are arranged in the core airflow path C. The turbines 46, 54 rotationally drive the respective low speed spool 30 and high speed spool 32 in response to the expansion of the core airflow. It will be appreciated that each of the positions of the fan section 22, the compressor section 24, the combustor section 26, the turbine section 28, and geared architecture 48 or other fan drive gear system may be varied. For example, in some embodiments, the geared architecture 48 may be located aft of the combustor section 26 or even aft of the turbine section 28, and the fan section 22 may be positioned forward or aft of the location of the geared architecture 48.

The gas turbine engine 20 in one example is a high-bypass geared aircraft engine. In some such examples, the gas turbine engine 20 has a bypass ratio that is greater than about six (6), with an example embodiment being greater than about ten (10). In some embodiments, the geared architecture 48 is an epicyclic gear train, such as a planetary gear system or other gear system, with a gear reduction ratio of greater than about 2.3 and the low pressure turbine 46 has a pressure ratio that is greater than about five (5). In one non-limiting embodiment, the bypass ratio of the gas turbine engine 20 is greater than about ten (10:1), a diameter of the fan 42 is significantly larger than that of the low pressure compressor 44, and the low pressure turbine 46 has a pressure ratio that is greater than about five (5:1). The low pressure turbine 46 pressure ratio is pressure measured prior to inlet of low pressure turbine 46 as related to the pressure at the outlet of the low pressure turbine 46 prior to an exhaust nozzle. In some embodiments, the geared architecture 48 may be an epicycle gear train, such as a planetary gear system or other gear system, with a gear reduction ratio of greater than about 2.3:1. It should be understood, however, that the above parameters are only for example and explanatory of one non-limiting embodiment of a geared architecture engine and that the present disclosure is applicable to other gas turbine engines including turbojets or direct drive turbofans or turboshafts.

A significant amount of thrust is provided by the bypass flow B due to the high bypass ratio. The fan section 22 of the gas turbine engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 meters/second).

Gas turbine engines generate substantial amounts of heat that is exhausted from the turbine section 28 into a surrounding atmosphere. This expelled exhaust heat represents wasted energy, and can be a large source of inefficiency in gas turbine engines. Further, gas turbine engines, through the process of combustion generate waste, such as $CO_2$ and other byproducts. It has been difficult to achieve the power and thrust requirements using systems, particularly aircraft propulsion systems, with reduced or zero $CO_2$ emissions.

Figure 2:
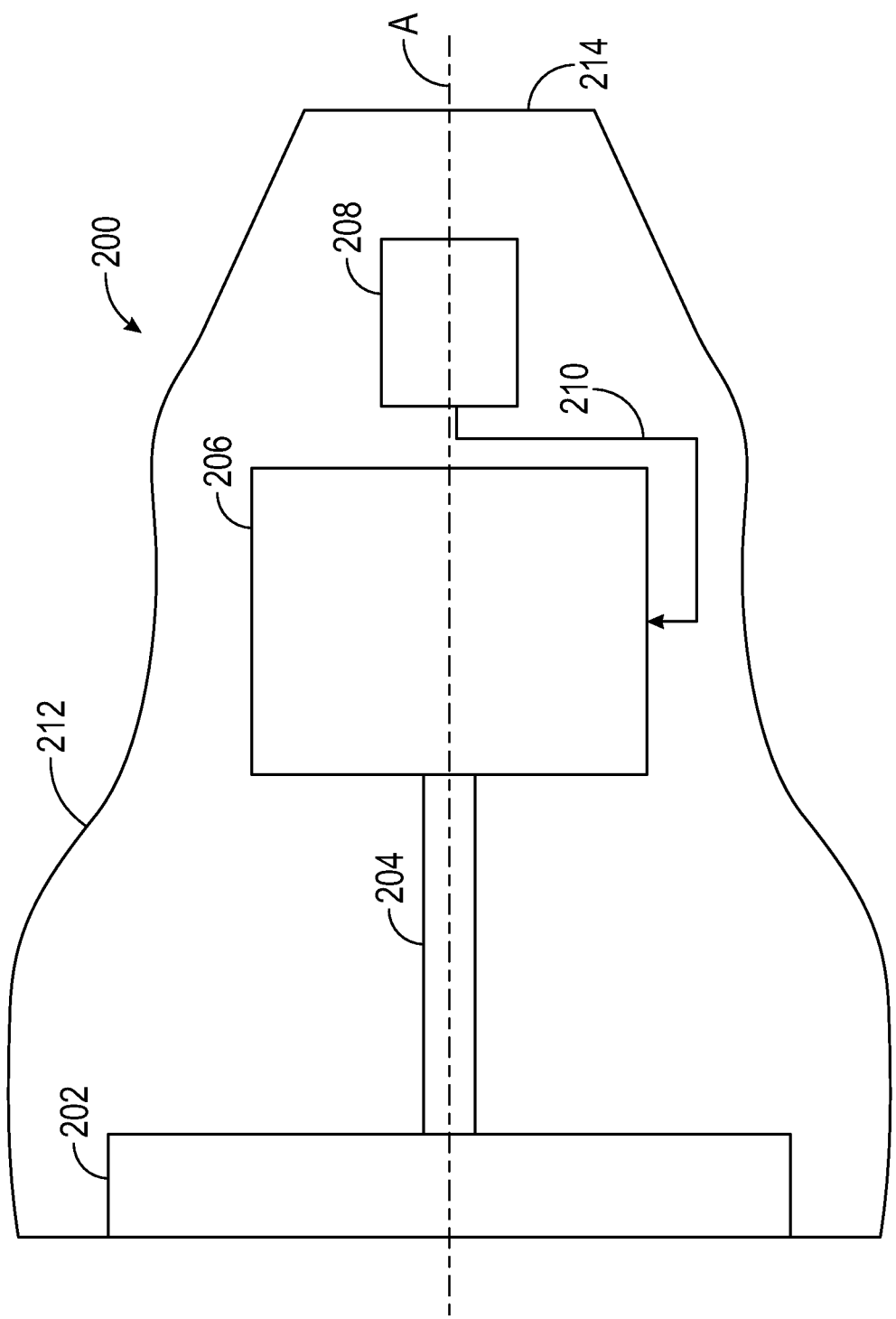
FIG. 2 is a schematic diagram of an aircraft propulsion system for an aircraft in accordance with an embodiment of the present disclosure.

Turning now to FIG. 2, a schematic diagram of an aircraft propulsion system 200 in accordance with an embodiment of the present disclosure is shown. The aircraft propulsion system 200 is a reduced combustion or non-combustion system, and includes a fan 202, a drive shaft 204, a motor 206, and an aircraft power generation system 208. The fan 202 is operably coupled to and configured to be rotated by the drive shaft 204 to generate thrust. The drive shaft 204 that drives rotation of the fan 202 is operably coupled to and driven by the motor 206. The motor 206 may be an electric motor that converts electrical power to mechanical (rotational) energy. The motor 206 receives power from the aircraft power generation system 208 along an electrical connection 210. The aircraft propulsion system 200 may be configured to operate within similar limits and envelops as the gas turbine engine 20 of FIG. 1 and may not require a core flow path and turbine section driven by combusted and expanded gas.

The fan 202, drive shaft 204, and motor 206 may be arranged along a propulsion system central longitudinal axis A, similar to that shown and described above. The fan 202, drive shaft 204, motor 206, and aircraft power generation system 208 can be mounted, installed, or otherwise housed within a propulsion system housing 212 which includes an exit nozzle 214 for directing an airfoil therethrough for the purpose of driving flight of an aircraft. The propulsion system housing 212 may be configured to be mounted to a wing or fuselage of an aircraft.

The aircraft power generation system 208 may be a solid fuel cell or similar power source (e.g., solid oxide fuel cell). The aircraft power generation system 208 can be configured to power the motor 206 and may be used as a power source for other propulsion system components and/or other aircraft systems and components. In a non-limiting example, the aircraft power generation system 208 may be configured to output about 1 to about 10 MW electrical power. In accordance with embodiments of the present disclosure, the aircraft power generation systems may be configured to generate at least 1 MW of electrical power. It will be appreciated that the aircraft power generation systems described herein are configured to generate, at least, sufficient power to drive the fan and provide sufficient thrust and propulsion for flight at cruise altitudes. The amount of electrical power may be selected for a given aircraft configuration (e.g., size, operating envelope requirements, etc.).

The aircraft power generation system 208 may be configured to combine hydrogen (e.g., liquid, compressed, supercritical, etc.) or other organic fluids as a propulsion fuel source with a fuel cell for an electronically driven aircraft. For example, in operation, the hydrogen is heated by the fuel cell waste heat (e.g., water output) via a heat exchanger and then expanded through a turbine connected to a generator to extract some electric power from the hydrogen before it is used in the fuel cell. The hydrogen can also be used as the cold sink to cool aircraft environmental control system and/or provide other onboard thermal management, prior being supplied to the fuel cell. The fuel cell can be configured to provide base electric power (e.g., suited for cruise operation). In some non-limiting configurations, some fuel (hydrogen) will bypass the fuel cell and be used in a small gas turbine to generate additional power for take-off and climb peak power needs.

Figure 3:
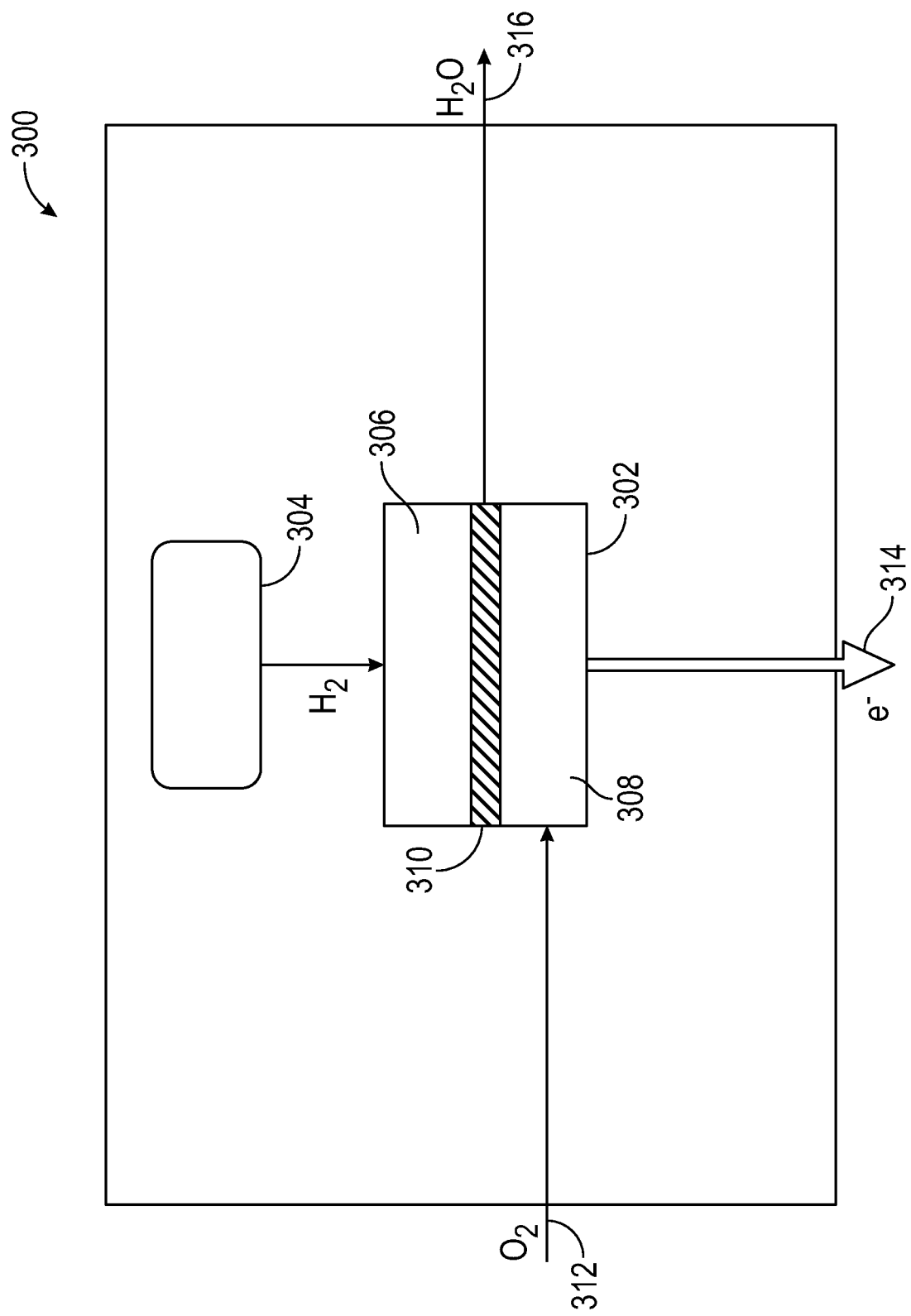
FIG. 3 is a schematic diagram of an aircraft power generation system in accordance with an embodiment of the present disclosure.

Turning now to FIG. 3, a schematic diagram of an aircraft power generation system 300 in accordance with an embodiment of the present disclosure. The aircraft power generation system 300 includes a fuel cell 302 and a fuel source 304 (such as a hydrogen fuel source). The fuel cell 302 is configured to generate electricity, as will be appreciated by those of skill in the art (e.g., a solid oxide fuel cell). For example, the fuel cell 302 can include an anode 306, a cathode 308, and an electrolyte membrane 310 therebetween. The fuel cell 302 is supplied hydrogen ($H_2$) from the fuel source 304, such as a liquid, compressed, supercritical tank or storage container. The fuel cell 302 is supplied with oxygen ($O_2$) from any oxygen source to an inlet 312, such as an ambient air intake or scoop on a housing assembly, as will be appreciated by those of skill in the art. The oxygen ($O_2$) and the hydrogen ($H_2$) are combined within the fuel cell 302 across the electrolyte membrane, which frees electrons for electrical power output 314. The combined oxygen ($O_2$) and hydrogen ($H_2$) results in the formation of water ($H_2O$), which may be passed through an outlet 316 and dumped overboard, supplied into a water tank, or otherwise used onboard an aircraft, as will be appreciated by those of skill in the art. For example, in one non-limiting embodiment, the water may be injected into a supplementary take-off gas turbine compressor for mass flow augmentation.

The electrical power output 314 may be electrically connected to a motor that is configured to drive a drive shaft and a fan of a propulsion system to generate thrust (e.g., as shown in FIG. 2). The electrical power output 314 may also be electrically connected to other electrical systems of a propulsion system and/or aircraft, as will be appreciated by those of skill in the art.

Figure 4:
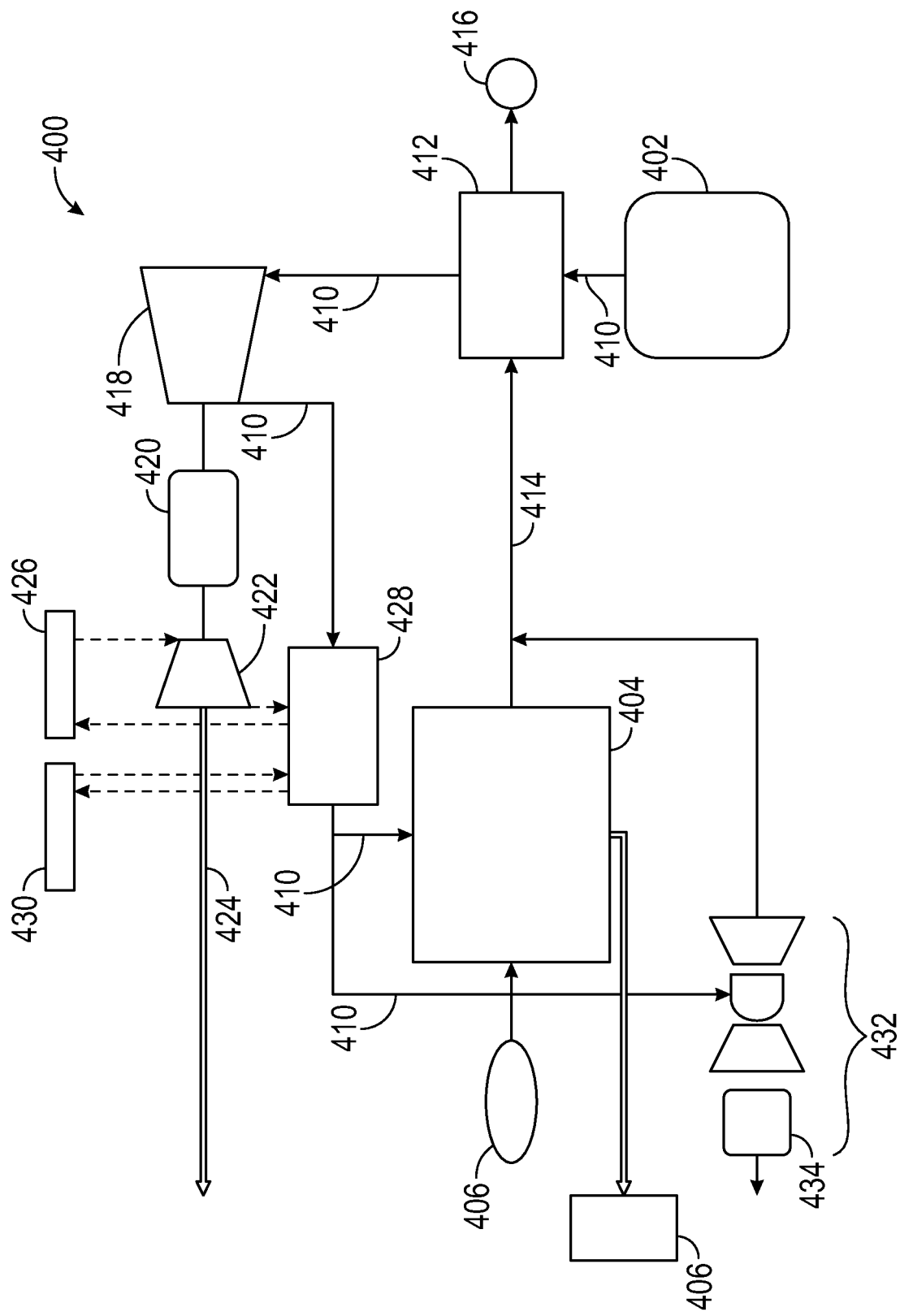
FIG. 4 is a schematic diagram of an aircraft system in accordance with an embodiment of the present disclosure.

Turning now to FIG. 4, a schematic diagram of an aircraft system 400 in accordance with an embodiment of the present disclosure is shown. The illustrative components of the aircraft system 400 may be housed within a propulsion system casing or other similar housing, as described above and/or may be operably connected to other parts of an aircraft. The aircraft system 400 includes an aircraft power generation system similar to that shown in FIG. 3, and has additional components within the system that may provide additional efficiencies and/or functionality to the aircraft system.

The aircraft system 400 includes a fuel source 402 that is configured to supply hydrogen ($H_2$) to a fuel cell 404, with the fuel cell 404 having oxygen ($O_2$), e.g., solid oxide and/or an oxygen supply 406, for catalyzing and generating electrical power, as described above. The fuel cell 404 is configured to generate electrical power, which may be supplied to a motor 408 and drive a fan to generate propulsion for an aircraft, as described above. Further, as noted above, the electrical power can also be distributed to other propulsion system and/or aircraft systems, without departing from the scope of the present disclosure.

In this configuration, the aircraft system 400 includes additional components which may take advantage of the use of an onboard power generation system, such as the fuel cell 404. For example, as shown, the fuel source 402 may supply hydrogen ($H_2$) into a fuel supply line 410 (e.g., a hydrogen flow path). Along the fuel supply line 410, the hydrogen ($H_2$), which may be stored at supercritical temperatures, may be warmed or increased in temperature prior to being supplied into the fuel cell 404. Accordingly, the hydrogen ($H_2$) may pass through a waste-heat heat exchanger 412. The waste-heat heat exchanger 412 may receive a relatively warm fluid (e.g., water) from an output of the fuel cell 404. As such, the waste-heat heat exchanger 412 may be arranged to receive hydrogen ($H_2$) from the fuel source 402 along the fuel supply line 410 and water ($H_2O$) from the fuel cell 404 along a water flow path 414 that receives an output from the fuel cell 404. The relatively warm water that is output from the fuel cell 404 may be used to warm or heat the hydrogen that is output from the fuel source 402. The water becomes a system output 416 (e.g., expelled overboard, stored, actively used onboard, etc.).

The warmed hydrogen ($H_2$) may then be directed into an expansion turbine 418 (e.g., a turbo expander). As the hydrogen ($H_2$) passes through the expansion turbine 418, the hydrogen ($H_2$) will be further increased in temperature. Additionally, as the hydrogen ($H_2$) flows through the expansion turbine 418, the expansion turbine 418 may be used to generate work or power at a generator 420. The generator 420 may be operably connected to a compressor 422 and/or an electrical output 424. The compressor 422 may further be operably connected to or employed with one or more aircraft air loads 426. After exiting the expansion turbine 418 the hydrogen ($H_2$) may be passed into an aircraft system cooler 428. The aircraft system cooler 428 may be a heat exchanger which further increases a temperature of the hydrogen ($H_2$) prior to entry into the fuel cell 404. The aircraft system cooler 428 can be used to cool the air of the aircraft air loads 426 and/or liquids of one or more aircraft liquid loads 430. The aircraft liquid loads 430 may be fluids used for cooling at other locations on the propulsion system and/or aircraft (e.g., cooling for power electronics, etc.).

After the hydrogen ($H_2$) passes through the aircraft system cooler 428, at least a portion of the hydrogen ($H_2$) will be directed into the fuel cell 404 for the generation of electricity, as described above. Further, in some embodiments, a portion of the hydrogen ($H_2$) may be directed to a supplemental power generator 432, such as a Brayton cycle. The supplemental power generator 432 may be a combustion-type generator that can generate extra power to drive a fan during takeoff or other high demand aircraft operations. In some embodiments, the supplemental power generator 432 may be used as a supplemental or additional power generator onboard the aircraft and/or as an auxiliary or backup power generator, as needed. As shown, the supplemental power generator 432 may include an associated generator 434 that can output additional electrical power. In some alternative configurations, the supplemental power generator 432 may be operably connected to the motor 408 and/or an associated drive shaft, to provide supplemental power in driving a fan for peak operations, such as takeoff. In some configurations, an output or byproduct of the supplemental power generator 432 may be exhaust, which can be added to the water flow path 414 upstream (as shown) or downstream from the waste-heat heat exchanger 412, or may be ejected overboard/to atmosphere. Further, in some embodiments, an output or byproduct of the supplemental power generator 432 may be recycled within the supplemental power generator 432 (e.g., recycling a water output within the combustion cycle/system).

It will be appreciated that alternative configurations are possible without departing from the scope of the present disclosure. For example, in some configurations, the expansion turbine or the aircraft system cooler may be eliminated. Further, in some configurations, in order to raise the hydrogen to appropriate temperatures for operation within the fuel cell, a heater may be arranged along the fuel supply line. In some embodiments, some such heaters may be electric heaters that are powered by the electrical output from the fuel cell. Furthermore, additional other systems and or components, typical to aircraft engine configurations, may be included and/or implemented without departing from the scope of the present disclosure.

Figure 5:
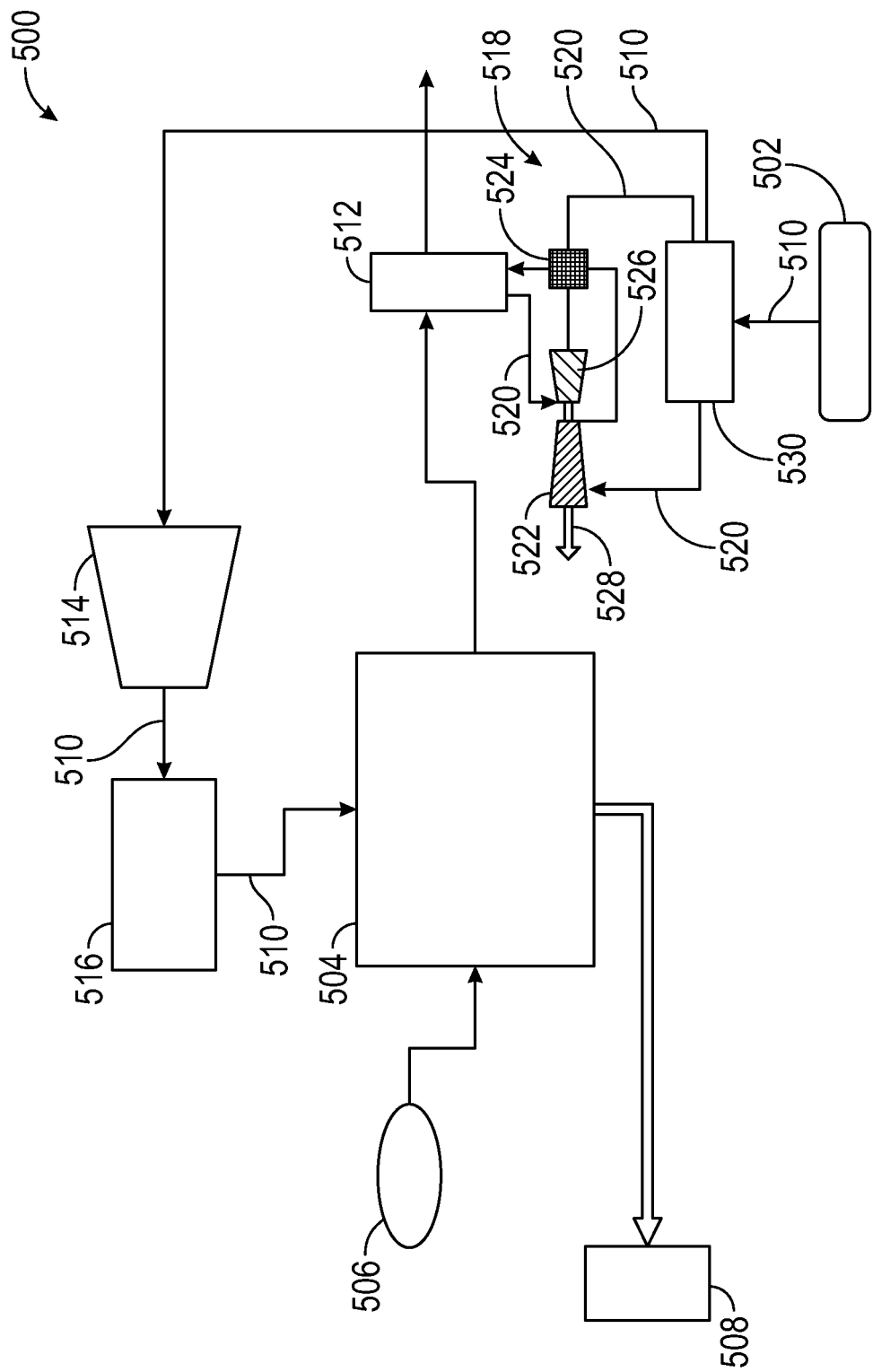
FIG. 5 is a schematic diagram of an aircraft system in accordance with an embodiment of the present disclosure.

Turning now to FIG. 5, a schematic diagram of an aircraft system 500 in accordance with an embodiment of the present disclosure is shown. The illustrative components of the aircraft system 500 may be housed within a propulsion system casing or other similar housing, as described above and/or may be operably connected to other parts of an aircraft. The aircraft system 500 includes an aircraft power generation system similar to that shown in FIG. 3 and has additional components within the system, which may provide additional efficiencies and/or functionality to the aircraft system.

The aircraft system 500 includes a fuel source 502 that is configured to supply hydrogen ($H_2$) to a fuel cell 504, with the fuel cell 504 having oxygen ($O_2$), e.g., solid oxide and/or an oxygen supply 506, for catalyzing and generating electrical power, as described above. The fuel cell 504 is configured to generate electrical power, which may be supplied to a motor 508 and drive a fan to generate propulsion for an aircraft, as described above. Further, as noted above, the electrical power can also be distributed to other propulsion system and/or aircraft systems, without departing from the scope of the present disclosure.

Similar to the configuration shown in FIG. 4, the fuel source 502 may supply hydrogen ($H_2$) into a fuel supply line 510. Along the fuel supply line 510, the hydrogen ($H_2$), which may be stored at supercritical temperatures, may need to be warmed or increased in temperature prior to being supplied into the fuel cell 504. Accordingly, the hydrogen ($H_2$) may pass through a waste-heat heat exchanger 512, an expansion turbine 514, and an aircraft system cooler 516. The expansion turbine 514 and the aircraft system cooler 516 may be part of other systems, as shown and described above. Further, a supplemental power generator may be included, as described above.

In this embodiment, the waste-heat heat exchanger 512 is incorporated into a waste heat recovery system 518, such as a supercritical $CO_2$ bottoming cycle. The waste heat recovery system 518 may be a closed-loop system that is configured to generate work through the use of a working fluid within the waste heat recovery system 518 (e.g., supercritical $CO_2$) which flows along a working fluid flow path 520.

The waste heat recovery system 518 includes a compressor 522 that compresses the working fluid and the compressed working fluid flows to a recuperating heat exchanger 524 and then into the waste-heat heat exchanger 512. The working fluid will be heated and directed into a turbine 526 which can be used to generate work 528.

In this configuration, to increase the temperature of the hydrogen ($H_2$) directly from the fuel source 502, along the fuel supply line 510, a pressure-balanced heat exchanger 530 is configured to exchange thermal energy between the hydrogen ($H_2$) and the working fluid of the waste heat recovery system 518. The hydrogen ($H_2$) within the fuel supply line 510 will be warmed prior to entering the expansion turbine 514 and the working fluid of the waste heat recovery system 518 will be cooled prior to entering the compressor 522 of the waste heat recovery system 518. The waste-heat heat exchanger 512 is arranged downstream of the fuel cell 504, and excess heat from the fuel cell 504 is used in connection with the waste heat recovery system 518.

In the configuration shown in FIG. 5, the waste-heat heat exchanger 512 operates with a working fluid-cold sink. The heated working fluid may be used in a closed-loop Brayton cycle (e.g., compressor 522 and turbine 526) to extract more power than, for example, the hydrogen turbo expander by itself. As noted, the hydrogen ($H_2$) may be used as the cold sink for the working fluid closed-loop cycle (e.g., a cold sink for the waste heat recovery system 518). Such a configuration can provide a better pressure-balance in the thermal exchange, which in turn can result in a smaller and easier to design heat exchanger. In some configurations, a working fluid closed-loop cycle could include recompression (e.g., two compressors, two working fluid cooler heat exchangers, etc.).

Figure 6:
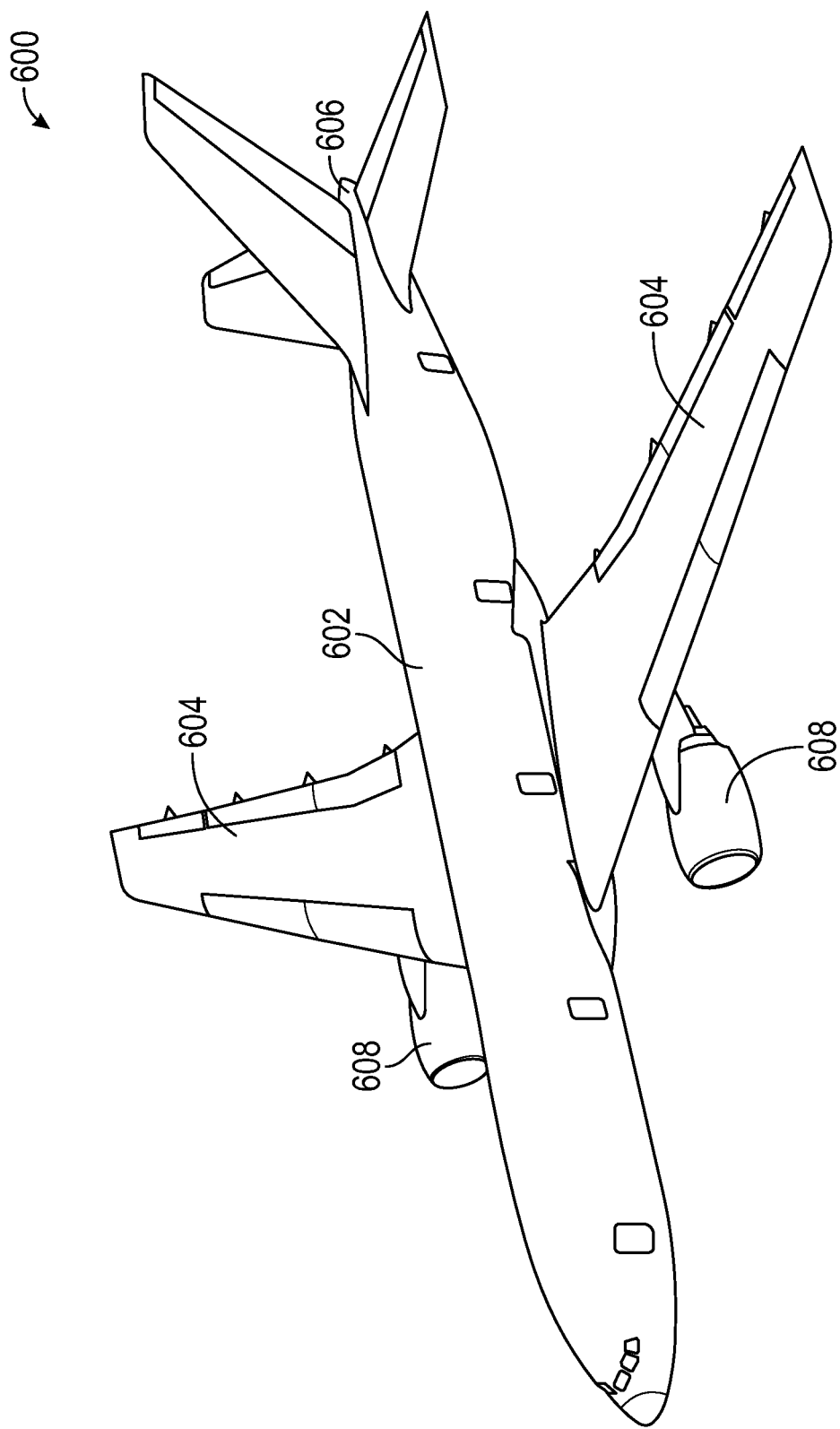
FIG. 6 is a schematic illustration of an aircraft that may incorporate embodiment of the present disclosure.

Turning now to FIG. 6, a schematic illustration of an aircraft 600 that may incorporate embodiments of the present disclosure is shown. The aircraft 600 includes a fuselage 602, wings 604, and a tail 606. In this illustrated embodiment, the aircraft 600 includes wing-mounted aircraft propulsion systems 608. The wing-mounted aircraft propulsion systems 608 may be fuel-cell based propulsion systems, as shown and described above. It will be appreciated that other aircraft configurations may employ the fuel-cell based propulsion systems of the present disclosure without departing from the scope of the present disclosure. For example, fuselage-mounted and/or tail-mounted configurations are possible. Further, any number of fuel-cell based propulsion systems may be employed, from one to four or more, depending on the aircraft configuration and power and thrust needs thereof.

Advantageously, embodiments of the present disclosure provide for an alternative aircraft propulsion system that is based on a fuel cell configuration. Such aircraft propulsion systems may be zero or near-zero $CO_2$ emission aircraft propulsion systems. Further, integration of a waste heat recovery system with a turbo expander (e.g., expansion turbine 418 of FIG. 4) and a Brayton cycle for peak power (e.g., supplemental power generator 432) with the hydrogen fuel source provides for fuel cell driven electric propulsion by reducing the size of the fuel cell needed. Accordingly, the power for flight operations (takeoff, cruise, etc.) may be achieved using the aircraft propulsion systems described herein, with or without supplemental power generation.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed:

1. An aircraft propulsion system comprising:
a fan;
a motor operably connected to the fan by a drive shaft;
an aircraft power generation system operably coupled to the motor to drive rotation of the fan through the drive shaft, wherein the aircraft power generation system comprises a fuel cell configured to generate at least 1 MW of electrical power; and
a closed-loop supercritical $CO_2$ bottoming cycle comprising a turbine, a compressor, a recuperating heat exchanger, a waste-heat heat exchanger, and a pressure-balanced heat exchanger, wherein a working fluid flows through the closed-loop supercritical $CO_2$ bottoming cycle along a working fluid flow path through the turbine, the recuperating heat exchanger, the waste-heat heat exchanger, the compressor, the pressure-balanced heat exchanger, and back to the turbine,
wherein fuel for the fuel cell is passed through the pressure-balanced heat exchanger of the closed-loop supercritical bottoming cycle prior to being supplied to the fuel cell.

2. The aircraft propulsion system of claim 1, wherein the aircraft power generation system comprises a fuel source.

3. The aircraft propulsion system of claim 2, wherein the fuel cell is a solid oxide fuel cell.

4. The aircraft propulsion system of claim 1, wherein the fan, the motor, and the aircraft power generation system are housed within a propulsion system housing.

5. The aircraft propulsion system of claim 4, wherein the propulsion system housing is configured to be mounted to a wing of an aircraft.

6. The aircraft propulsion system of claim 1, wherein the aircraft power generation system comprises a fuel supply line that originates at a fuel source, and passes through at least one of the waste-heat heat exchanger, an expansion turbine, and an aircraft system cooler, prior to being supplied to the fuel cell.

7. The aircraft propulsion system of claim 1, further comprising a supplemental power generator configured to receive at least a portion of a fuel of the fuel cell.

8. The aircraft propulsion system of claim 7, wherein the supplemental power generator is a Brayton cycle power generator.

9. The aircraft propulsion system of claim 7, wherein the supplemental power generator is configured to generate additional power and supplement the power generated by the fuel cell when driving the motor.

10. The aircraft propulsion system of claim 1, wherein the pressure-balanced heat exchanger receives a fuel for the fuel cell in one path and a working fluid of the waste heat recovery system in another path.

11. The aircraft propulsion system of claim 1, wherein the aircraft power generation system comprises an aircraft system cooler configured to use a fuel for the fuel cell as a cold sink and is configured to cool at least one of aircraft air loads and aircraft liquid loads.

12. An aircraft comprising:
a fuselage;
wings;
an aircraft propulsion system mounted to at least one of the fuselage and the wings, the aircraft propulsion system having:
  a fan; and
  a motor operably connected to the fan by a drive shaft;
an aircraft power generation system operably coupled to the motor to drive rotation of the fan through the drive shaft, wherein the aircraft power generation system comprises a fuel cell configured to generate at least 1 MW of electrical power; and
a closed-loop supercritical $CO_2$ bottoming cycle comprising a turbine, a compressor, a recuperating heat exchanger, a waste-heat heat exchanger, and a pressure-balanced heat exchanger, wherein a working fluid flows through the closed-loop supercritical $CO_2$ bottoming cycle along a working fluid flow path through the turbine, the recuperating heat exchanger, the waste-heat heat exchanger, the compressor, the pressure-balanced heat exchanger, and back to the turbine,
wherein fuel for the fuel cell is passed through the pressure-balanced heat exchanger of the closed-loop supercritical bottoming cycle prior to being supplied to the fuel cell.

13. The aircraft of claim 12, wherein the aircraft power generation system comprises a fuel source and the fuel cell is a solid oxide fuel cell.

14. The aircraft of claim 12, wherein the fan, the motor, and the aircraft power generation system are housed within a propulsion system housing.

15. The aircraft of claim 14, wherein the propulsion system housing is configured to be mounted to a wing of an aircraft.

16. The aircraft of claim 12, wherein the aircraft power generation system comprises a fuel supply line that originates at a fuel source, and passes through at least one of the waste-heat heat exchanger, an expansion turbine, and an aircraft system cooler, prior being supplied to the fuel cell.

17. The aircraft of claim 12, further comprising a supplemental power generator configured to receive at least a portion of a fuel of the fuel cell.

18. An aircraft propulsion system comprising:
a fan;
a motor operably connected to the fan by a drive shaft and configured to drive rotation of the fan to generate propulsion for an aircraft;
an aircraft power generation system operably coupled to the motor to drive rotation of the fan through the drive shaft, wherein the aircraft power generation system comprises a fuel cell configured to generate at least 1 MW of electrical power;
a closed-loop supercritical $CO_2$ bottoming cycle comprising a turbine, a compressor, a recuperating heat exchanger, a waste-heat heat exchanger, and a pressure-balanced heat exchanger, wherein a working fluid flows through the closed-loop supercritical $CO_2$ bottoming cycle along a working fluid flow path through the turbine, the recuperating heat exchanger, the waste-heat heat exchanger, the compressor, the pressure-balanced heat exchanger, and back to the turbine;
an expansion turbine coupled to a generator and configured to generate electrical power; and
a Brayton cycle supplemental power generator having a combustor, a turbine, and a compressor,
wherein fuel for the fuel cell is passed through the pressure-balanced heat exchanger of the closed-loop supercritical bottoming cycle, into and through the expansion turbine prior to being supplied to each of the fuel cell and the Brayton cycle supplemental power generator.

19. The aircraft propulsion system of claim 18, wherein an exhaust from the Brayton cycle supplemental power generator is passed through the waste-heat heat exchanger.

* * * * *